United States Patent
Normand et al.

(10) Patent No.: US 7,814,729 B2
(45) Date of Patent: Oct. 19, 2010

(54) STIFF PANEL HAVING COMPOSITE STIFFENERS WITH REDUCED SHOCK SENSITIVITY

(75) Inventors: Mathieu Normand, Toulouse (FR); Jean-Claude Lacombe, Blagnac (FR)

(73) Assignee: Airbus France, Toulouse (FR)

( * ) Notice: Subject to any disclaimer, the term of this patent is extended or adjusted under 35 U.S.C. 154(b) by 74 days.

(21) Appl. No.: 11/766,177

(22) Filed: Jun. 21, 2007

(65) Prior Publication Data
US 2008/0010942 A1 Jan. 17, 2008

(51) Int. Cl.
*E04C 2/38* (2006.01)
(52) U.S. Cl. .................. 52/800.1; 52/573.1; 52/783.18; 52/798.1; 52/799.11; 52/783.19; 296/146.6
(58) Field of Classification Search ................ 52/800.1, 52/474, 506.07, 573.1, 773, 783.11, 783.18, 52/784.14, 789.1, 793.1, 798.1, 799.11, 801.1, 52/846, 783.19; 296/39.1, 146.7, 146.6, 296/187.03; 293/133, 136; 188/371, 377
See application file for complete search history.

(56) References Cited

U.S. PATENT DOCUMENTS

| | | | | | |
|---|---|---|---|---|---|
| 1,385,217 | A | * | 7/1921 | Lutz | ............................ 52/464 |
| 3,207,057 | A | * | 9/1965 | Brown et al. | ................. 454/301 |
| 3,995,081 | A | | 11/1976 | Fant et al. | |
| 4,554,718 | A | * | 11/1985 | Ollinger et al. | .......... 52/506.07 |
| 5,325,647 | A | * | 7/1994 | Forry et al. | ............... 52/309.15 |
| 5,435,619 | A | * | 7/1995 | Nakae et al. | ........... 296/187.12 |
| 6,000,190 | A | * | 12/1999 | Richardson | ............... 52/204.57 |
| 6,032,433 | A | * | 3/2000 | Hatziathanasiou | ........ 52/742.12 |
| 6,443,513 | B1 | * | 9/2002 | Glance | ......................... 293/133 |
| 6,712,179 | B2 | * | 3/2004 | Bouyonnet | .................. 181/290 |
| 6,883,858 | B2 | * | 4/2005 | Barz | ...................... 296/187.02 |
| 2002/0189195 | A1 | * | 12/2002 | McKague et al. | ......... 52/783.19 |
| 2006/0101763 | A1 | * | 5/2006 | Dohren | ..................... 52/506.07 |

FOREIGN PATENT DOCUMENTS

| | | |
|---|---|---|
| EP | 1134070 A1 | 9/2001 |
| FR | 1251327 | 12/1960 |
| GB | 794166 | 4/1958 |
| WO | 02055384 A2 | 7/2002 |

OTHER PUBLICATIONS

Sinha, Anil Kumar. Physical Metallurgy Handbook. 2003. (pp. 1.20-1.21). McGraw-Hill. <http://knovel.com/web/portal/browse/display?_EXT_KNOVEL_DISPLAY_bookid=1545 &VerticalID=0>.*

* cited by examiner

*Primary Examiner*—Richard E Chilcot, Jr.
*Assistant Examiner*—Branon C Painter
(74) *Attorney, Agent, or Firm*—Perman & Green LLP

(57) ABSTRACT

A stiff panel (1) comprises a skin (2) and at least one stiffener (3) of composite material on said skin. Free surface (311) of web (31) of stiffener (3) on the stiff panel according to the invention comprises a deformable core (33) and a covering (34) which covers core (33) and joins said core with structural part (35) of web (31). The width of core (33) is equal to or greater than the width of structural part (35) of web (31) of stiffener (3), depending on the shock energy against which panel (1) must be protected.

13 Claims, 3 Drawing Sheets

STIFF PANEL HAVING COMPOSITE STIFFENERS WITH REDUCED SHOCK SENSITIVITY

The present invention relates to panels having stiffeners of composite material. More particularly, the invention relates to stiff panels wherein the composite-material stiffeners have free surfaces with reduced shock sensitivity.

BACKGROUND

Stiff panels are frequently used in structures, such as, for example, the primary structures of aircraft. Composite materials are more and more widely used in particular, because they allow the mass of such structures to be reduced.

A stiff panel 1 is made up of a skin 2 and stiffeners 3. Often, as in the example of FIG. 1, the stiffener comprises a free surface 311 on the side of the stiffener opposite the panel.

When the stiffener is made of composite material, this free surface is particularly vulnerable to shocks.

Thus, during manufacturing operations as well as during handling of such panels, the simple dropping of a tool can lead to damage of a stiffener, for example, producing delaminations that affect the structural quality of the stiff panel.

The consequences can be very costly. In extreme cases, if the stiffener cannot be repaired, it is necessary to replace the panel.

Using stiffeners with reduced shock sensitivity has proven very important in reducing the vulnerability of the panels and for contributing to reducing the number of repairs or possible replacements brought about by damage due to shocks.

SUMMARY

The present invention proposes to reduce the shock sensitivity of stiff panels.

According to the invention, a stiff panel has a skin and at least one composite-material stiffener attached onto one surface of said skin, said stiffener having at least one web comprising a structural part and a free surface opposite the side of the stiffener that is attached to the skin; and on its free edge, the stiffener has a deformable core and a covering that covers the core and joins said core with the apex of the structural part of the web.

Preferably, the core is made of a material that can be deformed, at least temporarily, if shocks occur on the free surface of the stiffener. The material can be a rigid or semi-rigid foam or an elastomer that may have one or more cavities.

In one embodiment, in order to limit its impact on the mass and the size of the stiffener, the core has a width roughly equal to the thickness of the structural part of the web of the stiffener; the core is elongated and extends totally or partially over the length of the free surface of the stiffener. The core section can be approximately circular, polygonal or semicircular in shape. This embodiment is preferred when the protection is sufficient for the anticipated impact energies.

In another embodiment, in order to protect the stiffener against shocks of higher energy, the core is wider than the thickness of the structural part of the stiffener web. The core may have a circular or teardrop-shaped section. Advantageously, it will have a flat surface in order to distribute pressure if an object or person should lean against the stiffeners.

In order to transmit the minimum amount of force to the structural part of the stiffener core, the covering can be made of a metal or composite material with less rigidity. Advantageously, at least one ply of the [material of the] structural part of the stiffener web is used to make up the covering.

In one embodiment, in order to be able to protect stiffeners of defined geometry, the core is machined to match the shape of the apex of the structural part of the stiffener web.

In another embodiment, the apex of the structural part of the stiffener web is machined to the shape of the core, which permits optimizing the shape of the core in order to obtain the desired protection for said stiffener.

The invention also relates to a method for creating a stiff panel in which the covering that covers the core is joined onto said core (after it has been joined to the structural part of the stiffener web) and attached onto the lateral surfaces of said structural part.

In an alternative method for creating the panel, the core and the covering are assembled first and this preassembled unit is then joined to the structural part of the stiffener web.

In another alternative to this method for creating the panel, the skin is made of composite material, whereas the structural part of the stiffener web and the core, which are assembled first, are covered by at least one ply of the [material of the] skin, said ply making up the covering of the core.

BRIEF DESCRIPTION OF THE DRAWINGS

The detailed description of the stiff panel and the process for creating said panel is made with reference to the figures, wherein.

DETAILED DESCRIPTION

Figure 1:
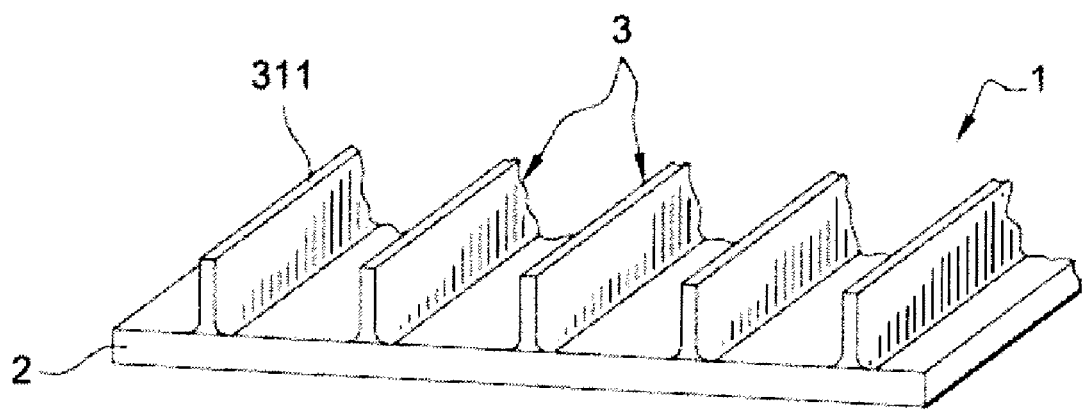
FIG. 1, which was mentioned above, presents a schematic perspective view of a stiff panel according to the prior art, FIG. 2 gives an example of a stiff panel according to the invention showing a detail of the constitution of a stiffener comprising a protective device, FIG. 3 gives different views (a, b, c, d, e) of stiff panels according to the invention, illustrating different sectional shapes of the stiffener core.
Figure 2:
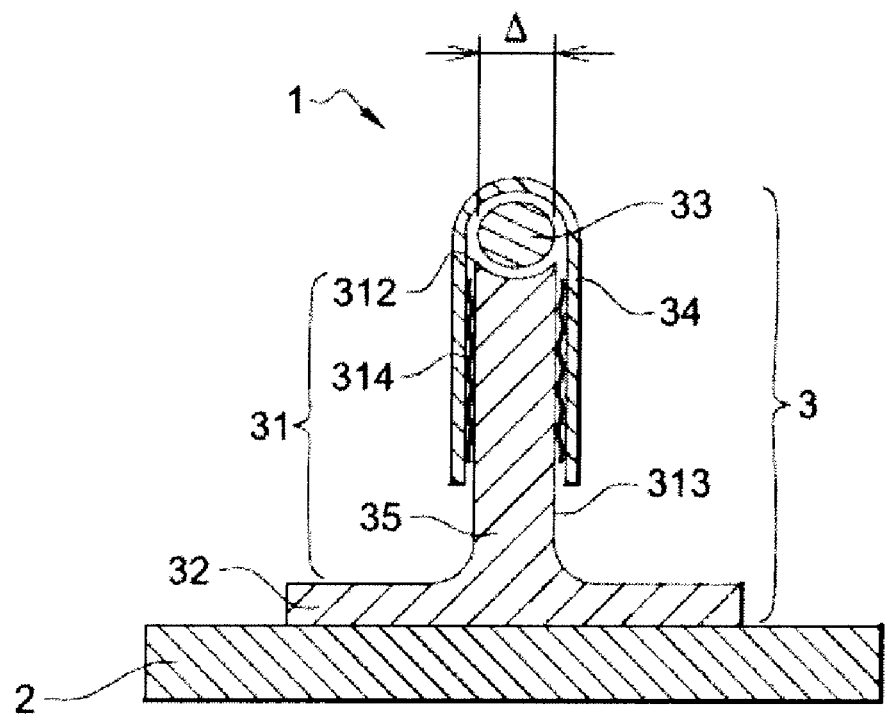

A stiff panel 1 according to the invention, as illustrated in FIG. 2, is made up of:
  a skin 2
  at least one stiffener 3, comprising a web 31 and a flange 32.

Said skin can be made of a metal or a composite material, for example, carbon fibers impregnated with resin.

Said at least one stiffener 3 is attached onto a surface of the skin by flange 32. Stiffener 3 can be attached by any conventional means, notably by gluing, or can be produced simultaneously with skin 2 when skin 2 is made of composite material; flange 32, in this case, can be integrated into skin 2. On the side of web 31 opposite flange 32, the stiffener has a free surface 311.

Web 31 of the at least one stiffener 3 has a structural part 35 made of a composite material, i.e., a fiberous material, such as, for example, carbon or glass fibers that are embedded in a matrix, for example, a resin. Said at least one stiffener can also be made of composite material layers comprising a stack of metal layers interleaved with layers of fiber-based composite material.

Moreover, on the side of its free surface 311 on the apex 312 of structural part 35 of web 31, stiffener 3 has the following:
  an element 33, called a core, of width A which is at least equal to the thickness of structural part 35 of web 31 of stiffener 3; said core is of elongated shape and extends totally or partially over the length of the stiffener on apex 312 of structural part 35 of web 31 of said stiffener.

a covering 34, which rests against lateral surfaces 313 of structural part 35 of web 31 of stiffener 3 and which covers core 33 and joins said core with structural part 35 of web 31. Preferably, said covering covers stiffener 3 over at least the length of core 33. Said covering is attached, for example, by glue 314 to structural part 35 of web 31 of stiffener 3.

Advantageously, in order to absorb shocks on free surface 311 of the stiffener, such as a shock induced when a tool is dropped on it, core 33 is made of a material that can be deformed at least temporarily when a shock occurs, and that can also distribute punctiform loads on free surface 311 over a more extensive surface of apex 312, to structural part 35 of web 31 of stiffener 3. In a preferred example of embodiment, the material of core 33 is a semi-rigid or rigid foam, for example, a polyurethane foam. Other materials or deformable structural elements, for example, an elastomer that may have at least one cavity, can also be used.

Covering 34 is created with the intent of providing a deformation capacity, on the one hand, and a low rigidity, on the other hand, in order to transmit minimum force to structural part 35 of web 31 of stiffener 3,. In a first embodiment, covering 34 is made of metal. For example, a covering of aluminum or aluminum alloy, which is thinner than structural part 35 of web 31 of stiffener 3, can be deformed under the effect of a shock. Moreover, due to its density, aluminum does not involve a significant mass penalty on stiff panel 1. In another embodiment, covering 34 is made of a composite material such as a material based on carbon fibers, glass fibers or Kevlar® fibers impregnated with resin. The composite material used to create covering 34 can be of the same kind as that of structural part 35 of web 31 of stiffener 3 or it may be a different kind. When it is of the same kind, advantageously, covering 34 is formed by means of at least one outer ply of [the material of] structural part 35 of web 31 of the stiffener during the fabrication of said stiffener.

The thickness of covering 34 is also adapted as a function of the material used and of the impact energy that must be taken into consideration.

Covering 34 also permits visually monitoring whether stiffener 3 has undergone a shock, since this covering, by becoming deformed following said shock, receives a mark that is characteristic of the shock and of the impact energy. Depending on the characteristics of this mark, it is possible to determine whether the structural part of the stiffener may have been damaged.

Core 33, which is approximately cylindrical and covers all or part of apex 312 of structural part 35 of web 31 of stiffener 3 may have different sectional shapes.

Figure 3A:
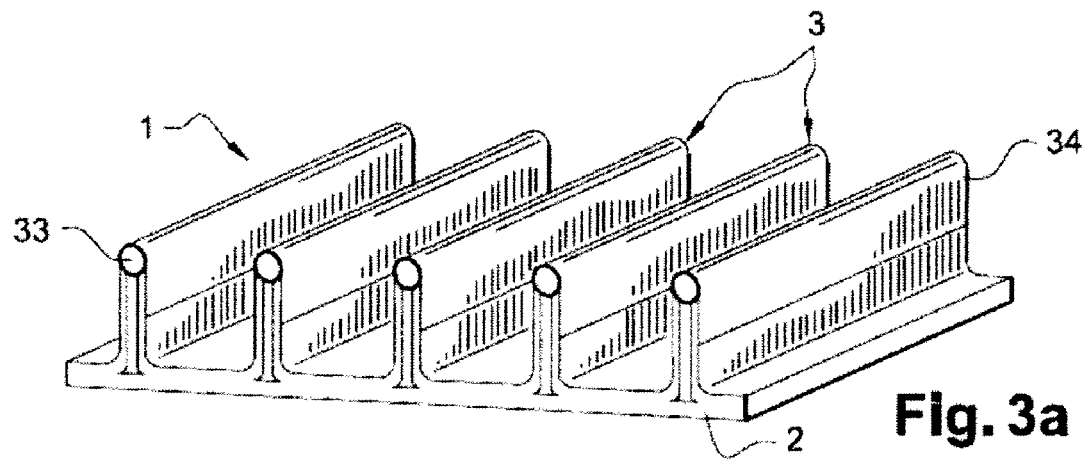

In a first embodiment such as is presented in FIGS. 2 and 3a, the section of core 33 is roughly circular or polygonal and of width Δ approximately equal to the thickness of structural part 35 of web 31 of stiffener 3. This core shape permits limiting the impact of the protective device on the dimensions of stiffener 3 and on its mass when the protection obtained is sufficient for the shock energies envisioned.

Figure 3B:
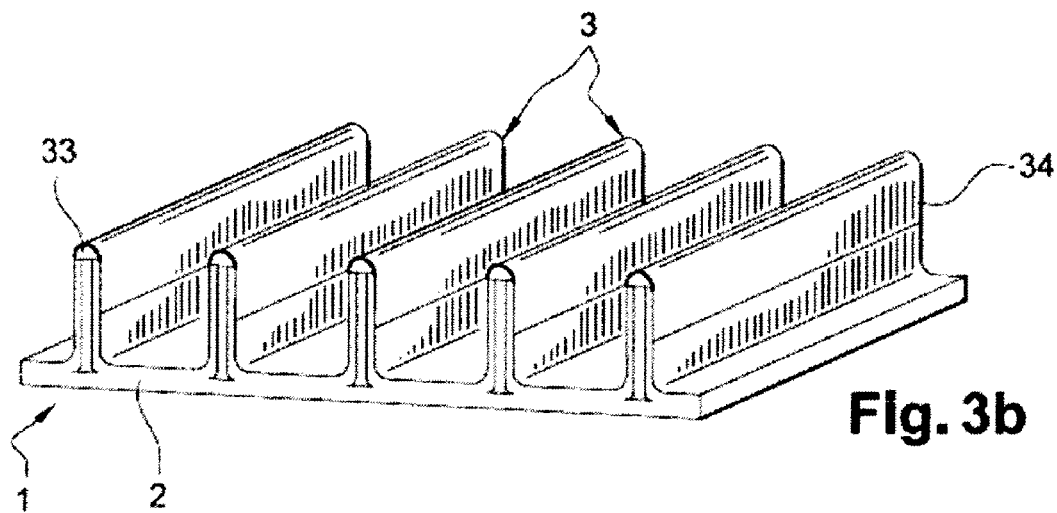

In particular, the sectional shape of core 33 is advantageously semicircular, as shown in FIG. 3b, when apex 312 of structural part 35 of web 31 of stiffener 3 is roughly flat. This shape of the core according to the invention permits protection for existing or already designed stiffeners 3 with an approximately flat apex 312, without modifying the existing parameters for creating stiff panels 1.

Figure 3C:
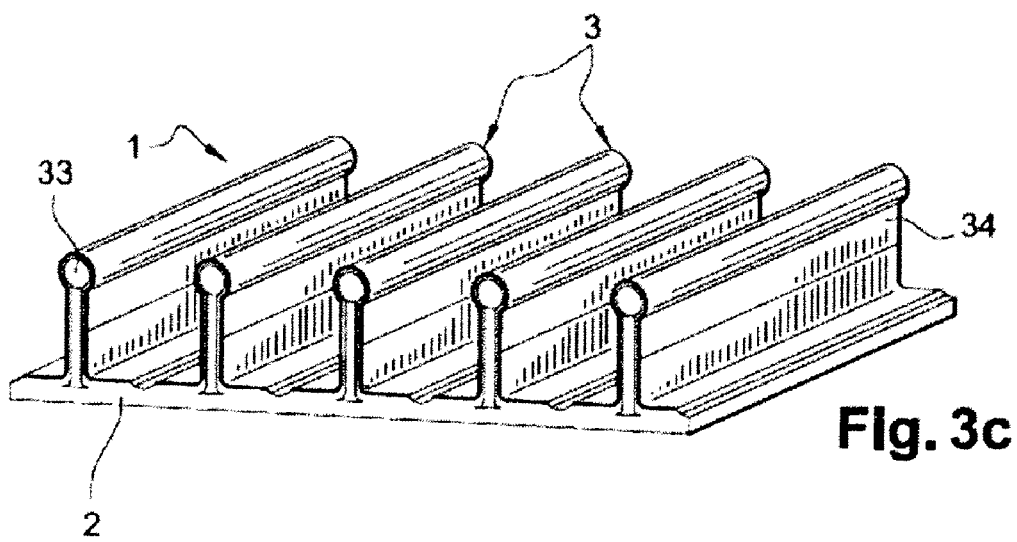
Figure 3D:
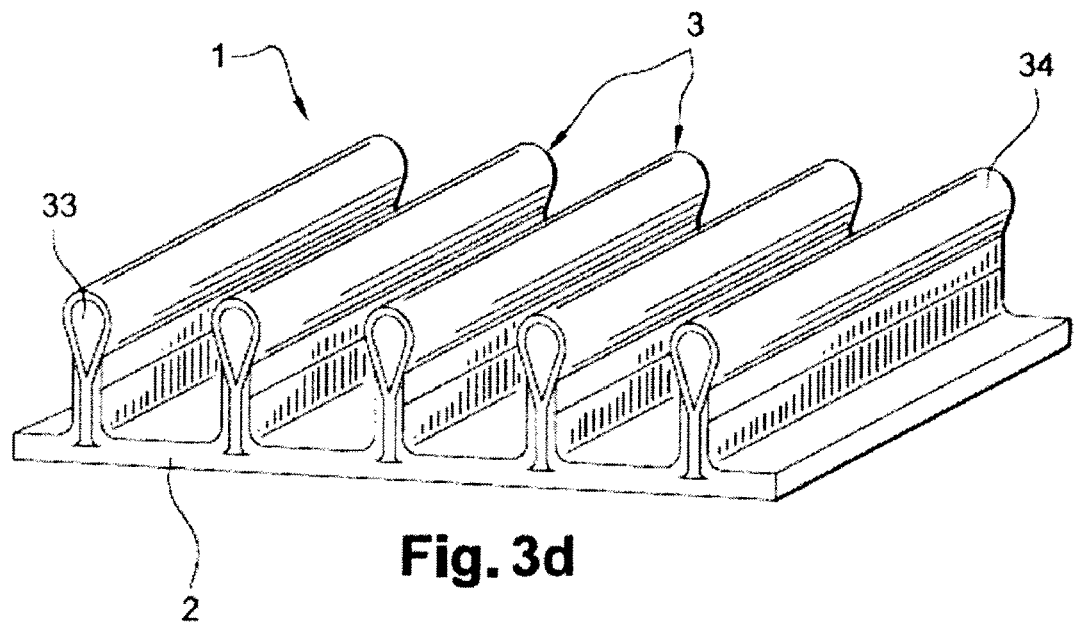

In a second embodiment, such as shown in FIGS. 3c and 3d, the core section is somewhat wider than the structural part 35 of web 31 of stiffener 3, for example, it has a circular or teardrop-shaped section. Such an arrangement permits protecting stiffener 3 from shocks of greater energy than in the first embodiment, notably due to the greater thickness of core 33 and the better covering of apex 312 of structural part 35 of web 31 of stiffener 3.

Figure 3E:
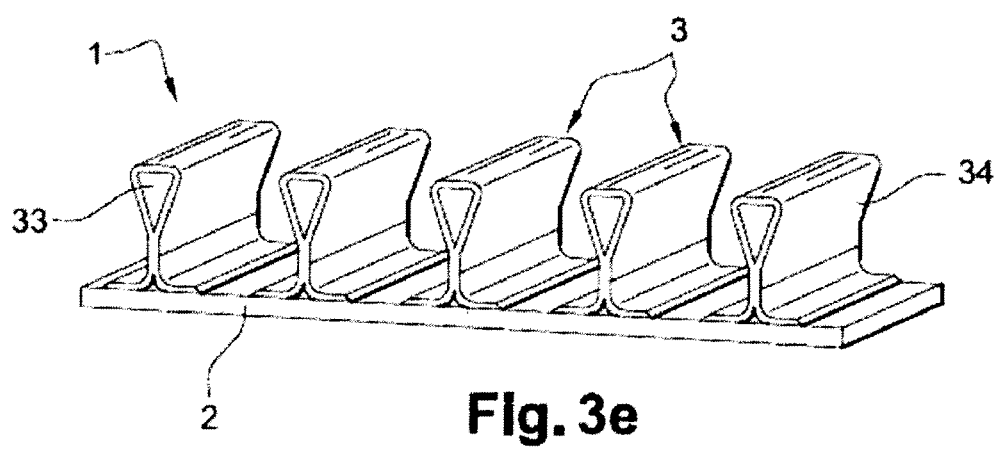

In one particular form of this second embodiment, the core has a relatively flat free surface 311, roughly parallel to the plane of stiff panel 1, as shown in FIG. 3e. In this embodiment, the side of stiffener 3 opposite stiff panel 1 permits its use as a support surface, for example, when an object is positioned there or when an operator accidentally steps on stiff panel 1, and limits the risk of deformation of the core by distributing the pressure.

The present invention is not limited to the examples of cores 33 described above by way of non-limiting examples. The person skilled in the art is free to adapt the shape of said core to shapes that have not been described, in particular, as a function of the protection sought.

In one embodiment, the core is machined or molded so as to match the shape of apex 312 of structural part 35 of web 31 of stiffener 3. This embodiment is suited to cases where stiffener 3 already exists or has already been designed.

In another embodiment, when the shape of the core is defined beforehand as a function of the protection performance sought, apex 312 of structural part 35 of web 31 of stiffener 3 is machined to match the shape of core 33 at rest.

In order to create a stiff panel 1 according to the invention, a first method consists of making a stiff panel in the conventional manner, then positioning a core 33 on apex 312 of structural part 35 of web 31 of stiffener 3 and covering said core 33 by a covering 34. Said covering can be a preformed metal or composite covering glued onto the lateral surfaces 313 of structural part 35 of the web of stiffener 3, or can be an unhardened composite material that is then hardened during a final curing. This first method is particularly suitable for placing protective devices on existing stiffeners.

Another method, in a first step, consists of providing a protective device comprising core 33 and covering 34, said core and covering first being assembled, for example, by gluing, and, in a final step, positioning and gluing core 33 and assembled covering 34 to structural part 35 of web 31 of each stiffener 3 of stiff panel 1. This method is suitable for positioning a protective device on previously created stiff panels 1. No particular modification of the method for creating or assembling stiff panels 1 is necessary. The step of positioning and gluing the core and the covering together is carried out when the stiff panel is manufactured.

Another method consists of simultaneously creating and assembling the three elements: stiffener, core and covering. This method is particularly suitable for creating stiff panels 1 (skin 2 and stiffener 3) made entirely of composite. At least one outer ply of the [material of the] skin is placed on the structural part of web 31 of the stiffener and core 33 in order to constitute covering 34.

The invention thus permits obtaining a stiff panel 1 having a stiffener of composite material with reduced shock sensitivity.

The invention claimed is:

1. A structural panel for a vehicle comprising:
   a panel;
   a plurality of stiffeners, each of said plurality of stiffeners constructed of a reinforcing material embedded in a matrix, said plurality of stiffeners mounted on the panel, each of the stiffeners comprising:
      a web forming a structural part and extending outward from the panel, said web having a free surface on an apex of a distal end;

a core covering the free surface, said core constructed of a deformable, shock absorbing material; and a cover, separate from the web, enclosing the core and fastened to a lateral surface of the web.

2. The structural panel of claim 1 wherein the core has a width substantially equal to or greater than the thickness of the web, and extends totally or partially over the length of a distal edge of the free surface.

3. The structural panel of claim 1 wherein the plurality of stiffeners are each constructed with a flange at an attachment end of the web, said flange providing an extended surface for securing each stiffener to the panel, and further wherein the web extends outward from the flange.

4. The structural panel according to claim 1 wherein the distal end of the web and a surface of the core have a complimentary form.

5. The structural panel according to claim 1 wherein the core has a cross-section of semicircular shape.

6. The structural panel according to claim 1 wherein the deformable material is resilient to absorb shock.

7. The structural panel according to claim 1 wherein the deformable material is a rigid or semi-rigid foam.

8. The structural panel according to claim 1 wherein the deformable material is an elastomer having at least one cavity.

9. The structural panel according to claim 1 wherein the core has a cross-section having a circular or polygonal shape.

10. The structural panel according to claim 1 wherein the core has a cross-section having a teardrop shape.

11. The structural panel according to claim 1 wherein the core has a flat surface approximately parallel to the plane of the panel.

12. The structural panel according to claim 1 wherein the cover is a metal material.

13. The structural panel according to claim 1 wherein the cover is a composite material.

* * * * *

UNITED STATES PATENT AND TRADEMARK OFFICE
CERTIFICATE OF CORRECTION

PATENT NO. : 7,814,729 B2
APPLICATION NO. : 11/766177
DATED : October 19, 2010
INVENTOR(S) : Mathieu Normand et al.

It is certified that error appears in the above-identified patent and that said Letters Patent is hereby corrected as shown below:

Title Page, Col. 1, Below "(65) Prior Publication Data", insert -- (30) Foreign Application Priority Data Jun. 22, 2006 (FR) 2006-52584 --.

Signed and Sealed this

Twenty-first Day of December, 2010

David J. Kappos
*Director of the United States Patent and Trademark Office*